(12) United States Patent
Heule et al.

(10) Patent No.: US 9,550,236 B2
(45) Date of Patent: Jan. 24, 2017

(54) DEBURRING TOOL FOR DEBURRING BORE MARGINS

(71) Applicant: Ulf Heule, Belgach (CH)

(72) Inventors: Heinrich Heule, Au (CH); Harry Studer, Balgach (CH)

(73) Assignee: Heule Werkzeug AG, Balgach (CH)

( * ) Notice: Subject to any disclaimer, the term of this patent is extended or adjusted under 35 U.S.C. 154(b) by 416 days.

(21) Appl. No.: 13/906,829

(22) Filed: May 31, 2013

(65) Prior Publication Data

US 2013/0330141 A1 Dec. 12, 2013

(30) Foreign Application Priority Data

Jun. 9, 2012 (EP) .................................... 12004377

(51) Int. Cl.
*B23B 51/10* (2006.01)

(52) U.S. Cl.
CPC .......... *B23B 51/101* (2013.01); *B23B 2210/08* (2013.01); *Y10T 408/8583* (2015.01); *Y10T 408/865* (2015.01); *Y10T 408/907* (2015.01)

(58) Field of Classification Search
CPC ............... B23B 51/101; B23B 2210/08; Y10T 408/8583; Y10T 408/865
See application file for complete search history.

(56) References Cited

U.S. PATENT DOCUMENTS

| 5,135,338 | A | * | 8/1992 | Heule | 408/187 |
| 5,181,810 | A | * | 1/1993 | Heule | 408/147 |
| 5,209,617 | A | * | 5/1993 | Heule | 408/178 |
| 8,540,464 | B2 | * | 9/2013 | Heule | 408/154 |
| 8,721,233 | B2 | * | 5/2014 | Burr et al. | 408/156 |
| 2010/0196111 | A1 | * | 8/2010 | Heule | 408/187 |
| 2011/0052339 | A1 | * | 3/2011 | Burr et al. | 408/181 |

FOREIGN PATENT DOCUMENTS

| DE | 102008046489 A1 | 3/2010 | |
| EP | 0446767 A1 | 9/1991 | |
| EP | 2208566 A2 | 7/2010 | |
| EP | 2289657 A1 | 3/2011 | |
| FR | 1471025 A * | 2/1967 | ............ B23B 51/10 |
| JP | 06015515 A * | 1/1994 | |
| JP | H09267209 A | 10/1997 | |

OTHER PUBLICATIONS

European Patent Office, Search Report issued in Application No. 12004377.3 dated Aug. 28, 2012.

* cited by examiner

*Primary Examiner* — Eric A Gates
(74) *Attorney, Agent, or Firm* — Wood Herron & Evans LLP

(57) ABSTRACT

Deburring blade for deburring bore margins with an even or uneven shape, having a base body (1) which is rotatably driven about its longitudinal axis, in which base body at least one bar blade (3) is held exchangeably in a spring-loaded, swivelably mounted blade holder (2) in the base body (1) in a radial bar blade bore (7) of the blade holder (2), and the blade holder (2) is designed as an approximately cylindrical body, which is mounted rotatably in a bearing bore (6) of the base body (1).

24 Claims, 2 Drawing Sheets

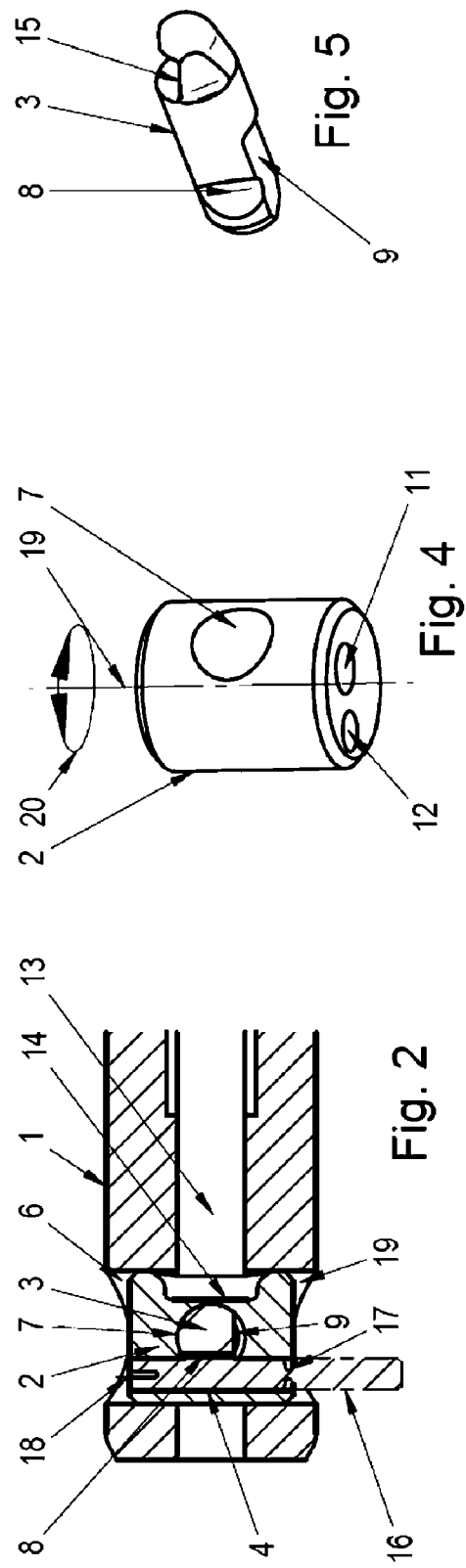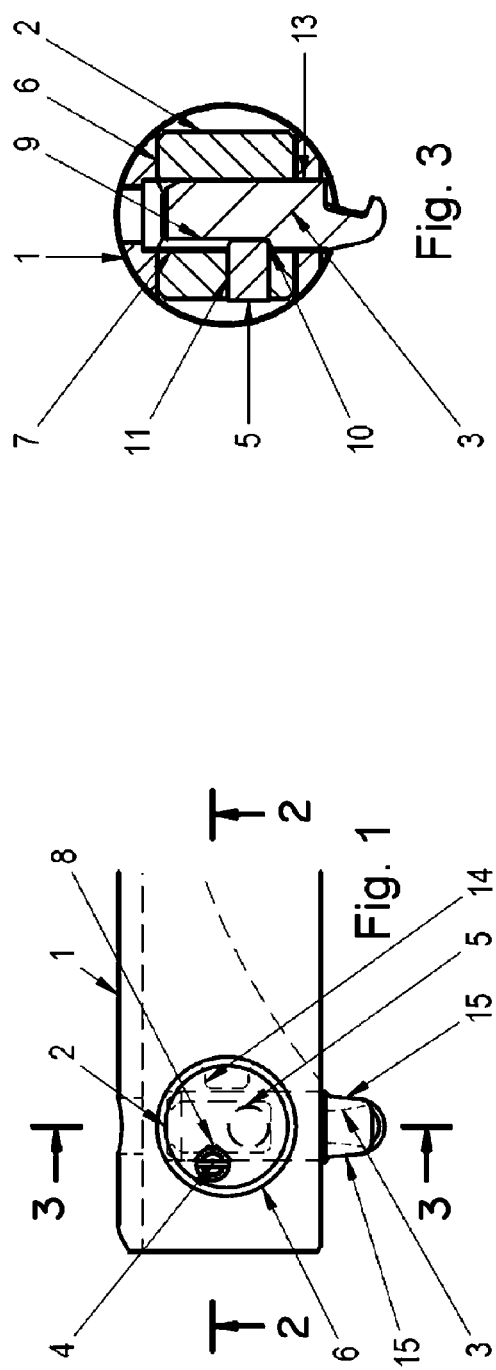

DEBURRING TOOL FOR DEBURRING BORE MARGINS

The subject matter of the invention is a deburring tool for deburring even and uneven bore margins according to the preamble of claim 1.

Such a deburring tool has been disclosed, for example, in DE 10 2008 046 489 A1, originating from the same applicant. However, the disadvantage of this known deburring tool is that a so-called blade holder has to be used to hold the bar blade, holder which consists of a rotating sleeve portion which is mounted rotatably on two mutually facing bearing bolts in the base body of the deburring tool.

The pivot bearing of this blade holder has been found to be disadvantageous because two mutually aligned bores have to be produced from the two sides of the base body in the base body, into which bores the bearing bolts have been inserted. The resulting mounted bearing bolts are applied with their front-side ends to the bar blade inserted in the blade holder.

Thus, four different parts had to be arranged in the smallest of spaces, namely two bearing bolts, a blade holder mounted rotatably on the bearing bolt, and a bar blade held exchangeably in the blade holder.

The problem with the mounting was that it was difficult to firmly hold the bearing bolts in a force fit in the bores of the base body. Therefore, an adhesive or another liquid and hardenable agent was used, which in turn was associated with the disadvantage that, if residues of this agent reached the interior space of the deburring tool, the blade holder itself could no longer rotate.

Therefore, the difficulties during the mounting and the removal were considerable. The removal was impossible, because the bearing bolts were held firmly in a forced fit in the associated bores. In order to loosen the forced fit of the bearing bolts, the entire tool had to be warmed, in order to remove the bearing bolts from their fit by the thermally caused longitudinal expansion of the individual parts.

The invention is therefore based on the problem of further developing a deburring tool according to DE 10 2008 046 489 A1, while maintaining the same properties as those of the deburring tool shown therein, so that the bar blade can be held substantially more simply more operationally reliably in the base body of the deburring tool.

To solve the posed problem, the invention is characterized by the technical teaching of Claim 1.

The essential feature of the invention is that the blade holder is no longer firmly secured with two diametrically facing bearing bolts in the base body; instead, it is rotatably mounted as a cylindrical rotating body in a receiving bore in the base body, without requiring any bearing bolts.

The change of the blade holder, according to the invention, was associated with difficulties. It had to be recognized that the bearing bolts shown in DE 10 2008 046 489 A1 could be omitted if the blade holder is designed as a round cylindrical part or as a round cylindrical sleeve, sleeve which is received directly in a receiving bore in the base body. Thus the swivel mount of the blade holder by means of two bearing bolts, as described in DE 10 2008 046 489 A1, is omitted.

This results in the advantage that only two parts are present now, namely the blade holder itself, and the bar blade to be inserted into the blade holder, wherein, however, the invention is not limited to the insertion of a single bar blade into the blade holder. Two bar blades diametrically opposite each other can also be used. This was not possible in the case of the subject matter of DE 10 2008 046 489 A1, because the blade holder used there was provided and suitable only for receiving a single bar blade.

Besides the simpler mounting of the bar blade, the removal is also simplified, because the bar blade for removal merely needs to be pulled out of the cylindrical blade holder.

For a simpler mounting of the blade holder, a pull-out safety device is used. The pull-out safety device consists of a bolt whose length can be shortened and which can be broken off, said bolt passing through a transverse bore in the blade holder, penetrating with a side surface into the bore for receiving the bar blade, and bearing on the side against an associated seat on the bar blade in order to protect the bar blade from unintentional pulling out.

Instead of such a pull-out safety device that can be broken off and is in the shape of a bolt, other pull-out safety devices can also be used, such as, for example, a screw that is screwed in, or a expanding pin that is driven into the bore and remains there.

However, a pull-out safety device that can be broken off and is bolt-like has the advantage that even in the case of small dimensions of the deburring tool, a handle for holding the bolt-like pull-out safety device is provided, and the handle can later be broken off after the completion of the mounting at associated predetermined breaking points of the pull-out safety device.

For the removal of the blade holder, the pull-out safety device, which preferably has a slit on its head, is expelled with an appropriate expulsion tool from the bore, which is achieved in a particularly simple manner. As soon as the pull-out safety device has been removed, the bar blade can also be removed, and then the blade holder falls out of its transverse bore in the base body. Thus, very simple mounting and removal are ensured.

The production of a sleeve-shaped blade holder which has a cylindrical design is particularly simple and cost effective in comparison to blade holder with complicated shape shown in the older Patent Application DE 10 2008 046 489 A1.

Because the blade holder with its entire circumference is mounted rotatably in the larger receiving bore in the base body, and is no longer held rotatably by means of two small bearing bolts, a more stable swivel mount of the blade holder according to the invention is achieved in comparison to the older patent application.

The blade holder as well as the associated transverse bore in the base body can therefore be designed with a substantially larger diameter, and this results in a stable hold of the blade, without wear over a long tool life, which was not the case with the older patent application.

Similarly, the receiving bore for the bar blade can be larger in the new blade holder in comparison to the already known blade holder. There, the size of the receiving bore was limited by the mutually facing bearing bolts which had to have a certain excess length in order to still achieve an effective swivel mount of the blade holder. This is dispensed with according to the invention, because, in the invention, the swivel mount is no longer produced by means of the bearing bolts, instead it is produced by the transverse bore itself, which is arranged in the base body.

Accordingly, in the blade holder, a substantially larger receiving bore can be provided for receiving the bar blade compared to the older patent application.

A larger bore necessarily results in a more stable blade mount of the bar blade, which is associated with a precise guidance of the deburring tool, even in the case of small deburring diameters.

The subject matter of the invention has the following advantages in comparison to the mentioned prior art.

1. The blade system now is modular in design and consists of only two parts
2. The bar blade, as a part subject to wear, can now be exchanged in a simple manner
3. The blade holder for the bar blade at the same time is also the bearing element in the base body
4. No further bearing elements, such as bolts, pins and the like are needed
5. The bar blade itself secures the blade holder in the axial direction by the guidance in the blade groove of the base body.

The subject matter according to the invention, in the present invention, is derived not only from the subject matter of the individual claims, but also from the combination of the individual claims with each other.

All the indications and features disclosed in the documents, including the abstract, particularly the spatial design represented in the drawings, are claimed as essential to the invention to the extent that they are novel, individually or in combination, in comparison to the prior art.

The invention is explained in greater detail below in reference to a drawing that represents merely one embodiment approach. Here, further characteristic features of the invention and advantages of the invention are apparent from the drawing and its description.

FIG. 1 shows a side view of the deburring tool at the front end

FIG. 2 shows a cross section along line A-A in FIG. 1

FIG. 3 shows a cross section along line B-B in FIG. 1

FIG. 4 shows a perspective view of the blade holder

FIG. 5 shows a perspective view of the bar blade

Figure 6:
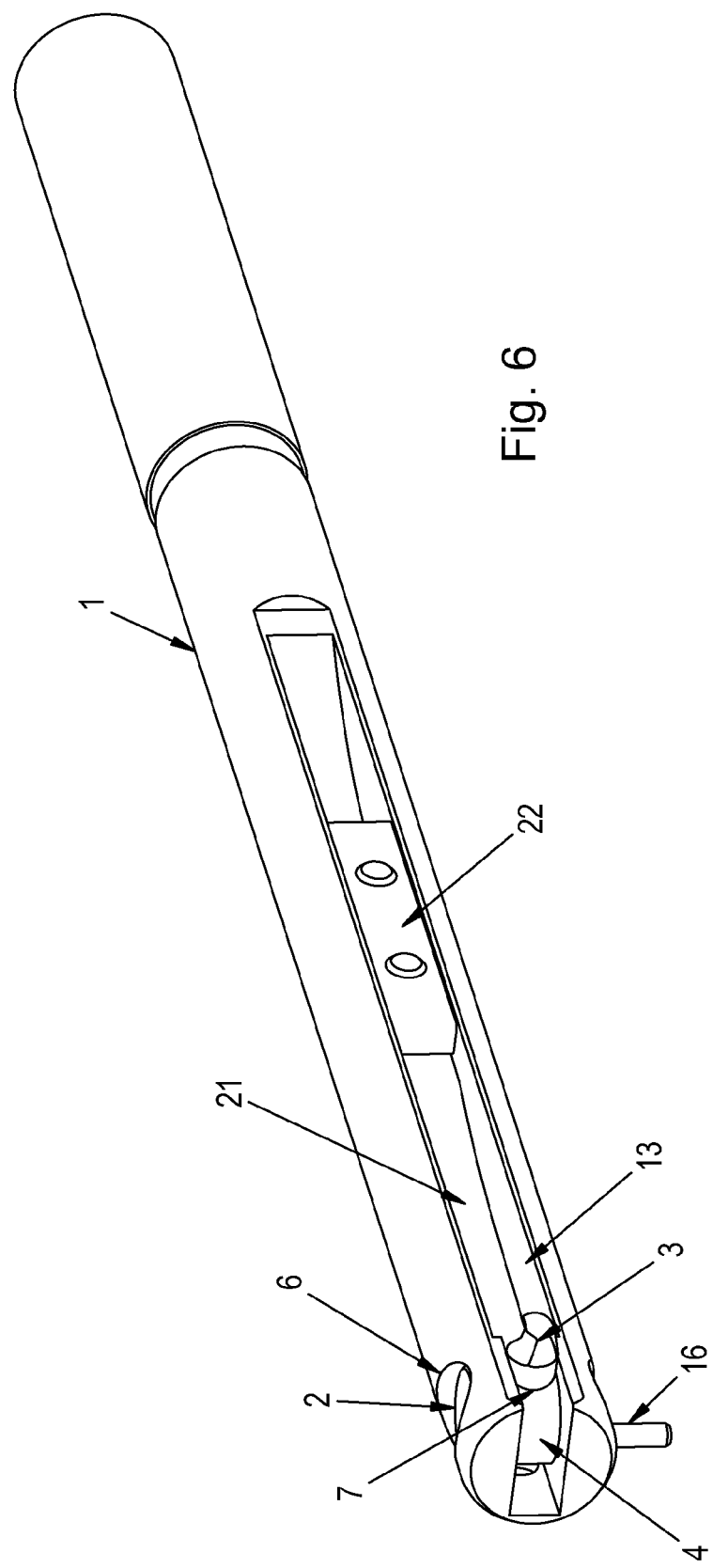
FIG. 6 shows a perspective view of the deburring tool.

With a view to the function and the design of the deburring tool according to the invention, reference is made to the content of DE 2008 046 489 A1 originating from the same applicant. Said disclosure content is included in its entirety by the disclosure of the present invention.

According to a preferred embodiment, the base body 1 of the deburring tool is rod-shaped, that is of cylindrical design. The invention is not limited to this design. It can also be designed in any desired cross-sectional shape, in particular a hexagonal, square or generally polygonal shape.

The front end of the base body 1 is represented in further detail in FIG. 1. In the top view, one can see that the blade holder 2 is received in a bearing bore 6 which passes through the base body 1 in the transverse direction. The bearing bore 6 is designed as a transverse bore, and it passes through the base body 1 in the perpendicular direction with respect to its longitudinal extent near the tip, as can be seen best in FIGS. 1 and 2.

The bearing bore 6 consists of two mutually facing and mutually aligned bores in the base body. The two bores of the bearing bore 6 are separated from each other in the center of the base body by the blade groove 13 in the base body. This means that, in the inner space, the bearing bore 6 is hollow, so that the cylindrical blade holder 2 is inserted into the mutually facing bores in the transverse direction with respect to the base body, into the bearing bore 6. The blade holder 2 is shown in a perspective view in FIG. 4.

FIG. 2 does not show that a longitudinal leaf spring is inserted into the longitudinal recess referred to as the blade groove 13 in the base body 1 of the deburring tool; said leaf spring engages with its front, free and flexible end into a radially exterior control groove 14 that is open on one side on the blade holder 2, and thus it exerts a springy prestress for the swivel mount of the blade holder 2. The blade holder 2 can therefore be rotated only against the force of the spring around a neutral center position into two mutually facing pivot bearings that are prestressed by a spring.

Instead of a leaf spring which engages with its free, flexible end into the associated control groove 14 that is open on one side on the outer circumference of the blade holder 2, other spring means can also be used, such as, for example, a leg spring, a helical compression spring, a spring-loaded piston, a spring-loaded pin, or an elastomer body.

The spring clamping means engages in a spring-loaded manner on the outer circumference of the blade holder 2 into the control groove 14, so that said blade holder can be turned only in a spring-loaded manner over a certain swivel angle of 45 degrees, for example, to the left and to the right around its rotation axis 19 in the arrow directions 20.

According to FIG. 4, the cylindrical blade holder 2, on its face, has a bore 12 which extends through the blade holder 2, and which is arranged approximately parallel to the rotation axis 19. A pull-out safety device 4 is mounted in this bore 12. On its side facing the handle 16, the pull-out safety device 4 has a slit 18 for axial securing.

For the mounting of the blade holder 2 in the transversely extending bearing bore 6 in the base body 1, first the blade holder 2 in the form of a cylindrical part is inserted into the bearing bore 6, wherein the spring is still removed from the blade groove 13.

Next, the bar blade 3 represented in FIG. 5 is inserted into the bar blade bore 7 in the blade holder 2.

The bar blade 3 is shown in further detail in FIG. 5. Starting from the front cutting edge 15 toward the rear, on the approximately round cylindrical body of the bar blade 3, a groove 8 is provided which perforates the cylindrical diameter, and which has a V-shaped profile, for example.

Furthermore, transversely to the cutting edges 15, a radial positioning surface 9 is provided on the bar blade 3.

For the mounting of the entire arrangement, the blade holder 2 without inserted bar blade 3 is inserted into the bearing bore 6 on the base body 1. Subsequently, the bar blade 3 is inserted into the bar blade bore 7 on the blade holder 2. It is important that a positionally safe mounting of the bar blade 3 in the associated bar blade bore 7 on the blade holder 2 is ensured by the fact that the bar blade 3 has the radial positioning surface 9 by means of which it is inserted in the bore 7 according to FIG. 3.

Into the bore cross section of the bar blade bore 7, a positioning bolt 5 extends with its front face which is brought in a position so it bears against the positioning surface 9 of the bar blade 3. In this manner, the bar blade 3 cannot be inserted with the wrong orientation or in incorrect position into the bar blade bore 7.

Instead of a positioning bolt 5, other position-securing projections can also be provided, which are arranged, instead of a threaded bolt, as fixed projections in the bar blade bore 7, and which engage in the free cross section of the bar blade bore 7.

Accordingly, the bar blade 3 can be inserted only in the orientation shown in FIG. 3 into the bar blade bore 7. The positioning bolt 5 therefore assumes a position with its front axial positioning surface 10 against the associated radial positioning surface 9 of the bar blade 3, positioning the latter in a correct position in the bar blade bore 7.

Moreover, the positioning bolt 5 is received in a positioning bore 11 on the lower face of the blade holder 2 according to FIG. 4.

The pull-out safety device 4 is inserted into the bore 12 on the blade holder 2. The pull-out safety device 4 engages in the mounted state into the groove 8 on the outer circumference of the bar blade 3. The groove 8 preferably has a V-shaped design in order to ensure a twisting-proof and shift-proof position of the bar blade 3 in the bar blade bore 7 in the blade holder 2.

After the insertion of the pull-out safety device 4, the handle 16 can be broken off at the predetermined breaking points 17.

For the removal, action is exerted with an appropriate tool on the slit 18 of the pull-out safety device 4, so that the latter is knocked out of the positioning bore 11 in the direction of its longitudinal extent.

Subsequently, the rotating drive for the blade holder 2 can be mounted in the form of a leaf spring—not shown in further detail—which is then clamped into the blade groove 13 and which engages with its front, springy free end into the control groove 14 on the outer circumference of the blade holder 2.

The advantage of the represented mounting is that, when the pull-out safety device 4 is being removed, the bar blade 3 both forward in the direction of its front cutting edges 15.

FIG. 6 shows the perspective representation of the deburring blade. Identical parts bear identical reference numerals. In addition, it can be seen that a flexible spring 21, as a leaf spring that is clamped in on one side, generates the spring prestress for the blade holder 2. For this purpose, the flexible spring 21 is secured with its rear end in the blade groove 13 with a screw-on plate 22. The front, free and flexible end of the flexible spring 21 engages into the control groove 14 on the outer circumference of the blade holder 2 according to FIG. 1, and prestresses the latter in a spring-loaded manner in the arrow directions 20.

LEGEND FOR THE DRAWING

1 Base body
2 Blade holder
3 Bar blade
4 Pull-out safety device
5 Positioning bolt
6 Bearing bore
7 Bar blade bore
8 Groove (pull-out safety device)
9 Positioning surface, radial
10 Positioning surface, axial
11 Positioning bore
12 Bore pull-out safety device
13 Blade groove
14 Control groove
15 Cutting edge
16 Handle
17 Predetermined breaking point
18 Slit
19 Rotation axis
20 Arrow direction
21 Flexible spring
22 Screw-on plate

The invention claimed is:

1. Deburring tool for deburring bore margins with an even or uneven shape, having a base body that is rotatably driven about its longitudinal axis, in which base body at least one bar blade is held exchangeably in a spring-loaded, swivelably mounted blade holder, the blade holder being an approximately cylindrical body mounted rotatably in a bearing bore of the base body, the bearing bore being transverse to the longitudinal axis of the base body, the bar blade having an approximately cylindrical body portion mounted rotatably in and relative to a bar blade bore of the blade holder, the bar blade bore being transverse to a longitudinal axis of the blade holder.

2. Deburring tool according to claim 1, wherein the bearing bore comprises two mutually facing and mutually aligned bores in the base body.

3. Deburring tool according to claim 2, wherein the two bores of the bearing bore are separated from each other in the center of the base body by a blade groove in the base body.

4. Deburring tool according to claim 2, wherein the cylindrical blade holder is inserted swivelably about its rotation axis into the mutually facing bores in the transverse direction with respect to the base body.

5. Deburring tool according to claim 1, wherein, into a blade groove designed as a longitudinal recess in the base body, a longitudinal flexible spring is inserted, which engages with its front free and flexible end into a radially exterior control groove on the blade holder which is open on one side, and which exerts a springy prestress for the swivel bearing of the blade holder.

6. Deburring tool according to claim 5, wherein the positional securing of the blade holder in the bearing bore of the base body in the axial direction consists of the bar blade which is applied in the blade groove.

7. Deburring tool for deburring bore margins with an even or uneven shape, having a base body that is rotatably driven about its longitudinal axis, in which base body at least one bar blade is held exchangeably in a spring-loaded, swivelably mounted blade holder in the base body in a radial bar blade bore of the blade holder, wherein the blade holder is designed as an approximately cylindrical body, which is mounted rotatably in a bearing bore of the base body,
  wherein the bearing bore comprises two mutually facing and mutually aligned bores in the base body,
  wherein the cylindrical blade holder is inserted swivelably about its rotation axis into the mutually facing bores in the transverse direction with respect to the base body,
  wherein the blade holder, on its face, has a bore which extends through the blade holder and which is arranged approximately parallel to the rotation axis, and in that a bolt-shaped pull-out safety device is inserted into the bore.

8. Deburring tool according to claim 7, wherein the pull-out safety device consists of a bolt whose length can be shortened and which can be broken off.

9. Deburring tool according to claim 8, wherein the pull-out safety device has a rod-shaped handle at its lower end, a handle which is connected via predetermined breaking points to the pull-out safety device.

10. Deburring tool according to claim 7, wherein, in an approximately cylindrical body portion of the bar blade, a groove is arranged which perforates the cylindrical diameter of the cylindrical body portion of the bar blade and which has a V-shaped profile, for example, in which groove the pull-out safety device engages.

11. Deburring tool according to claim 10, wherein, on the bar blade, transversely to the cutting edges, a radial positioning surface is arranged, which works together with a blade holder-side positioning bolt.

12. Deburring tool according to claim 11, wherein the positioning bolt bears with its front axial positioning surface against the associated radial positioning surface of the bar blade, and positions the latter in the correct position in the bar blade bore.

13. Deburring tool for deburring bore margins with an even or uneven shape, having a base body that is rotatably driven about its longitudinal axis, in which base body at least one bar blade is held exchangeably in a spring-loaded, swivelably mounted blade holder, the blade holder being an approximately cylindrical body mounted rotatably in a bearing bore of the base body, the bearing bore being transverse to the longitudinal axis of the base body, the bar blade having an approximately circular cylindrical body portion mounted in a bar blade bore of the blade holder, the bar blade bore being transverse to a longitudinal axis of the blade holder.

14. Deburring tool according to claim 13, wherein the bearing bore comprises two mutually facing and mutually aligned bores in the base body.

15. Deburring tool according to claim 14, wherein the two bores of the bearing bore are separated from each other in the center of the base body by a blade groove in the base body.

16. Deburring tool according to claim 14, wherein the cylindrical blade holder is inserted swivelably about its rotation axis into the mutually facing bores in the transverse direction with respect to the base body.

17. Deburring tool according to claim 16, wherein the blade holder, on its face, has a bore which extends through the blade holder and which is arranged approximately parallel to the rotation axis, and in that a bolt-shaped pull-out safety device is inserted into the bore.

18. Deburring tool according to claim 17, wherein the pull-out safety device consists of a bolt whose length can be shortened and which can be broken off.

19. Deburring tool according to claim 18, wherein the pull-out safety device has a rod-shaped handle at its lower end, a handle which is connected via predetermined breaking points to the pull-out safety device.

20. Deburring tool according to claim 13, wherein, into a blade groove designed as a longitudinal recess in the base body, a longitudinal flexible spring is inserted, which engages with its front free and flexible end into a radially exterior control groove on the blade holder which is open on one side, and which exerts a springy prestress for the swivel bearing of the blade holder.

21. Deburring tool according to claim 20, wherein the positional securing of the blade holder in the bearing bore of the base body in the axial direction consists of the bar blade which is applied in the blade groove.

22. Deburring tool according to claim 20, wherein, in the approximately cylindrical body portion of the bar blade, a groove is arranged which perforates the cylindrical diameter of the cylindrical body portion of the bar blade and which has a V-shaped profile, for example, in which groove the pull-out safety device engages.

23. Deburring tool according to claim 22, wherein, on the bar blade, transversely to the cutting edges, a radial positioning surface is arranged, which works together with a blade holder-side positioning bolt.

24. Deburring tool according to claim 23, wherein the positioning bolt bears with its front axial positioning surface against the associated radial positioning surface of the bar blade, and positions the latter in the correct position in the bar blade bore.

* * * * *